UNITED STATES PATENT OFFICE.

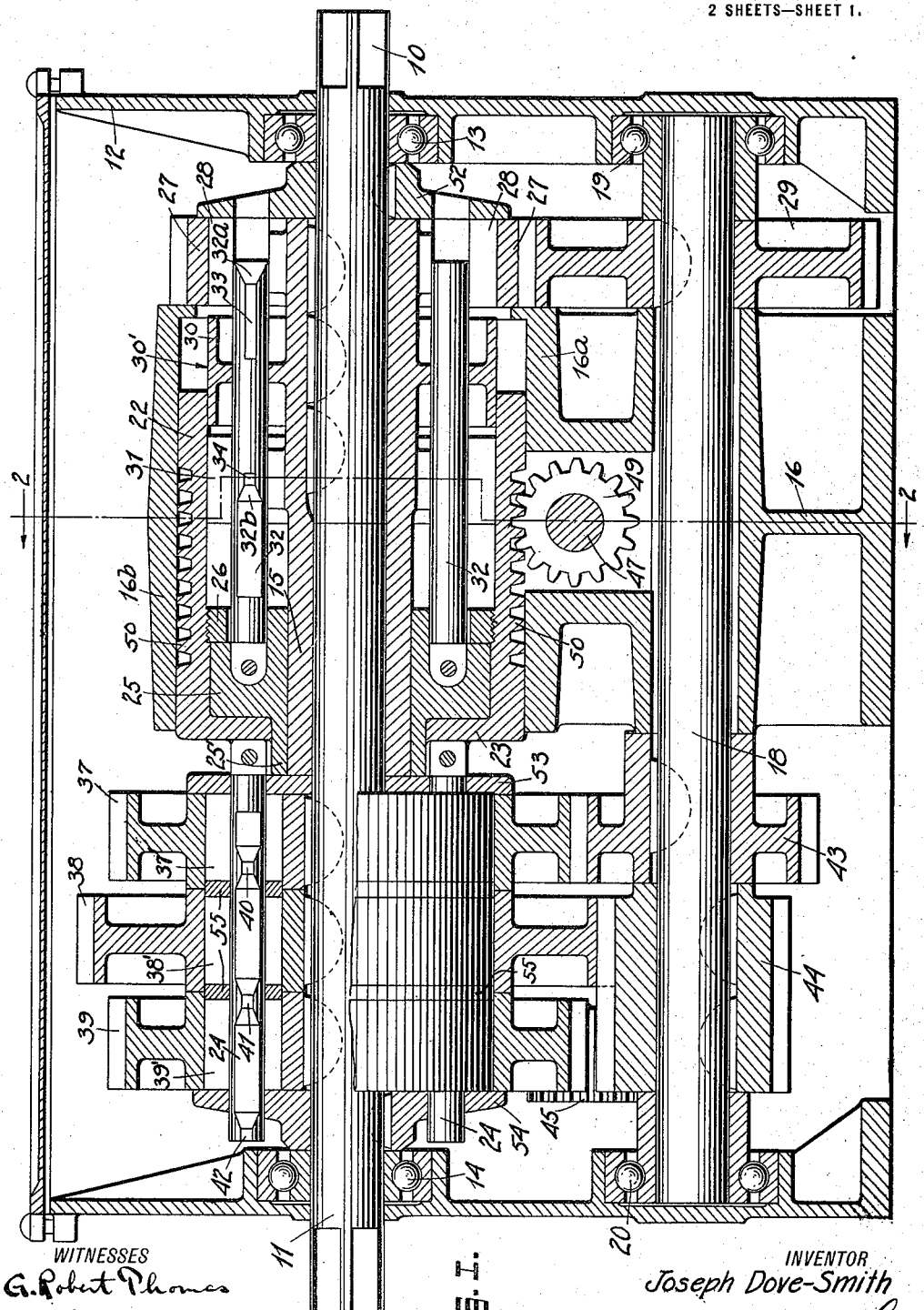

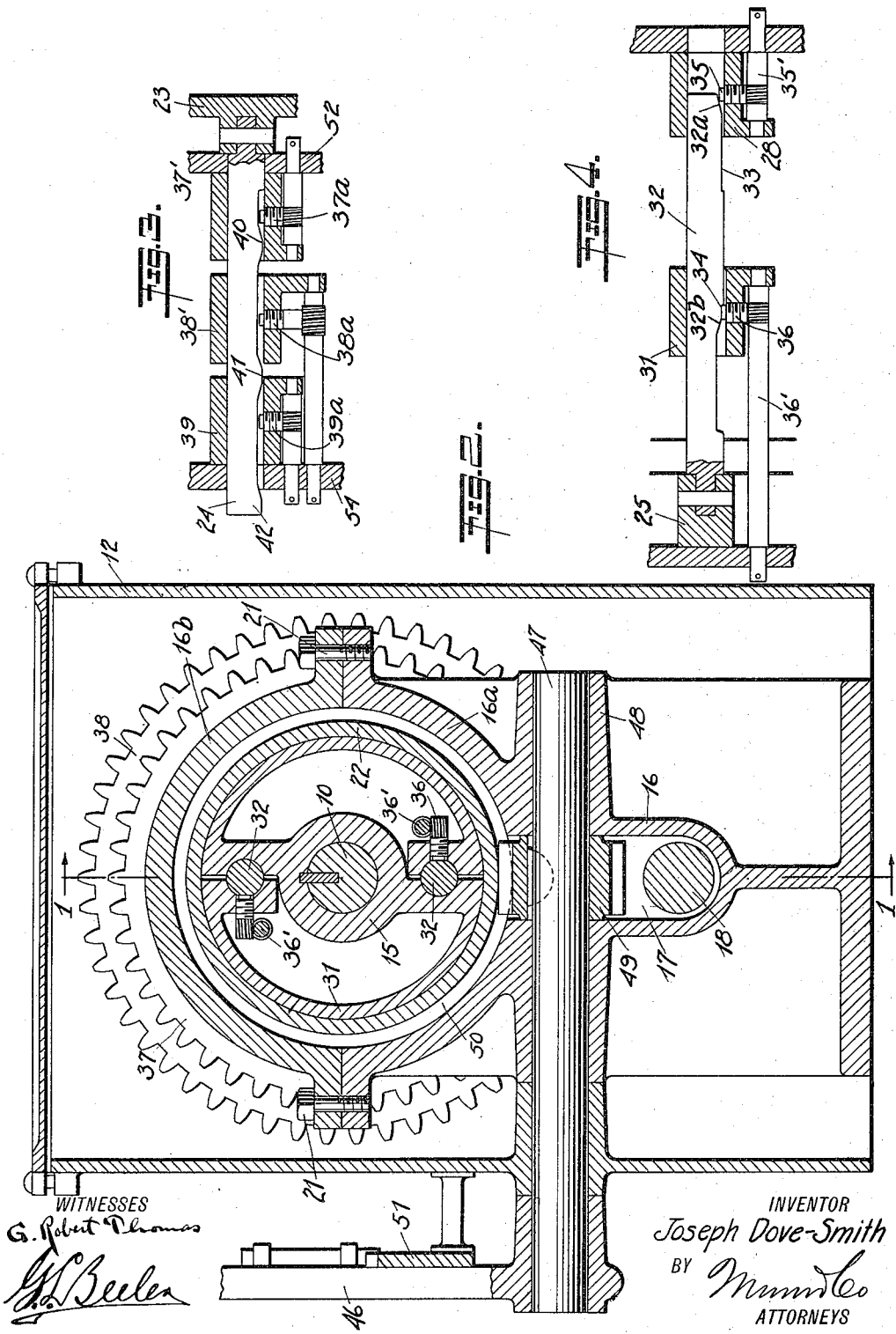

JOSEPH DOVE-SMITH, OF NIAGARA FALLS, NEW YORK.

VARIABLE-SPEED GEARING.

1,155,898.   Specification of Letters Patent.   Patented Oct. 5, 1915.

Application filed August 14, 1914. Serial No. 856,770.

*To all whom it may concern:*

Be it known that I, JOSEPH DOVE-SMITH, a subject of the King of Great Britain, and a resident of Niagara Falls, in the county of Niagara and State of New York, have invented a new and Improved Variable-Speed Gearing, of which the following is a full, clear, and exact description.

This invention relates to transmission devices and has particular reference to variable speed gearing adapted for automobiles and other machines which are to be driven at different speeds at different times from the same source of power.

More definitely stated, the principal object of this invention is to so improve upon the mechanism shown and claimed in my previous application filed November 19, 1913, Serial No. 801,852, as to make it possible for the driven shaft to be coupled directly to the driving shaft for the high speed adjustment. In other words, this invention comprises a driving shaft, a driven shaft and change speed mechanism between said shafts including a countershaft and gear wheels of different sizes, together with pairs of parallel wedges eccentric to the driving and driven shafts to cause certain of the gears to be made operative, certain of said wedges acting at times to cause direct positive connection between the driving and driven shafts.

The foregoing and other objects of the invention will hereinafter be more fully described and claimed and illustrated in the drawings forming a part of this specification in which like characters of reference indicate corresponding parts in all the views, and in which—

Figure 1 is a vertical longitudinal section substantially on the line 1—1 of Fig. 2; Fig. 2 is a vertical transverse section on the broken line 2—2 of Fig. 1; and Figs. 3 and 4 are detail diagrammatic views of the wedge devices and indicating the means for adjusting certain parts to take up for wear.

The several parts of the device may be made of any suitable materials, and the relative sizes and proportions, as well as the general design of the mechanism, may be varied to a considerable extent without departing from the spirit of the invention hereinafter more fully described and specifically claimed.

Referring more particularly to the drawings, I show at 10 a driving or motor shaft and at 11 a driven shaft, these two shafts being shown as being arranged coaxially. It is to be understood, however, that either of these shafts under certain conditions may be treated as the driving shaft and the other as the driven shaft, and they may be otherwise related than as shown.

Any suitable form or construction of casing 12 may be arranged to embrace the adjacent ends of the shafts and contain the principal parts of the change speed devices. The shafts are shown journaled in the opposite ends of the casing in roller bearings 13 and 14 respectively, and at 15 I show a sleeve surrounding and keyed to the inner end of the driving shaft and constituting a journal support for the inner end of the driven shaft. A bracket 16 is arranged within the casing and constitutes the main support for the change speed devices. This bracket has a longitudinal central cavity 17 through which projects a jack shaft 18, the ends of which are journaled in bearings 19 and 20 in the opposite ends of the casing and parallel to the axis of the motor and driven shafts. The bracket 16 comprises at its upper portion a semi-cylindrical bearing $16^a$ having a cap $16^b$ secured thereto as by bolts 21. This bearing and cap constitute a housing for a rotary and longitudinally adjustable cup 22. This cup has an inwardly projecting flange or shoulder 23 at its rear end to which a plurality of wedges 24 are connected on the outside of the shoulder, and a collar 25 is fitted against the inside of the shoulder and provided with a neck 25' fitted slidably to the outer surface of that portion of the sleeve 15 which embraces the inner end of the driven shaft. Said neck projects through the central opening formed in the shoulder 23. The collar 25 is locked in the position indicated by suitable means shown as a ring 26 screw-threaded into the interior of the cup 22.

Adjacent one end of the casing is a gear wheel 27 journaled loosely upon a split clutch member 28 constituting a rigid portion of the sleeve 15. This gear 27 meshes constantly with a gear 29 keyed to the jack shaft 18.

Adjacent the gear 27 is a hub 30 constituting another fixed portion of the sleeve 15 and having a smooth cylindrical periphery 30' coöperating with the smooth inner surface of the front end of the cup 22 and over which hub the cup is adapted to be adjusted longitudinally. The hub in effect constitutes a bearing for this end of the cup. The sleeve 15 has connected to it also another clutch member 31 within the cup and between the hub 30 and collar 25. A plurality of wedges 32 are connected at their rear ends to the collar 25 and are moved positively thereby along the clutches 28 and 31 and hub 30. Each wedge 32 is provided with an inclined surface 32$^a$ and another similar surface 32$^b$ leading to flat facets 33 and 34 respectively adapted to coöperate in alternation with studs 35 and 36 respectively carried by the clutches 28 and 31. Each of the studs 35 and 36 is provided at its outer end with gear teeth meshing with a worm 35′ or 36′ whereby the stud may be rotated and screwed in or out to vary its degree of wedging action with respect to the wedge 32.

At 37, 38 and 39 I show a series of gears mounted loosely upon clutch members 37′, 38′ and 39′ respectively, all secured as by keys to the driven shaft. These clutch members are of the same character as the clutch 31 shown in detail in Fig. 2 and are each provided with an adjustable lug 37$^a$, 38$^a$ or 39$^a$, each adapted to be adjusted by means of a worm similar to those above described. The wedges 24 extend through the split portions of the clutch members just described and are provided with inclined surfaces leading to flat faced facets 40, 41 and 42 coöperating with the studs 37$^a$, 38$^a$ and 39$^a$ respectively. These facets are arranged in echelon or stepped relation to the distances between central planes of the gears and clutches to which they relate, and when the cup 22, to the shoulder 23 of which the wedges 24 are connected, is moved longitudinally along the axis of the driving shaft, said facets are brought into coöperation in turn with the several clutches, causing one, but not more than one, of them to be set at one time.

The gear 37 meshes constantly with a pinion 43 keyed to the jack shaft. Likewise the gear 38 meshes with a longer pinion 44 also keyed to the jack shaft. The pinion 44 is shown as long enough to provide coöperation with the gear 39 through an idler 45 for reversing.

Any suitable means may be provided for adjusting the cup longitudinally with respect to the axis of the driving shaft and bracket 16. The means I prefer for this purpose includes a hand lever 46 connected to a rock shaft 47 journaled transversely of the casing in a bearing 48 of the bracket 16. In the space 17 is a pinion 49 keyed to the rock shaft and meshing with a series of circular teeth 50 extending around the outer surface of the cup 22. When the lever 46 is moved in either direction with respect to a stationary toothed arc 51 whereby the lever and rock shaft may be held in stationary position, the rotation of the rock shaft and pinion connected to it will slide the cup longitudinally of the sleeve 15 and thereby causing all of the wedges 32 and 24 to be moved with respect to the various clutches. The axis of the pinion 49 being always stationary while the cup may rotate, the arrangement of the teeth 50 is such that the pinion will always operate for the purpose set forth. Any suitable number of collars or disks 52, 53 and 54 may be mounted upon the driving and driven shafts so as to rigidify the movable devices and retain them in proper relation to one another, and likewise suitable disks 55 may be inserted between adjacent clutch members to prevent the wedges from twisting the arms of the clutch members and in some instances serving also as bearings for the gears, relieving the clutches from performing such function.

The construction having been described in detail, a brief statement will suffice to set forth the method of operation.

With the parts in the position shown in Fig. 1, all of the gears 27 and 37 to 39 are free from their respective clutches, and since the collar 25 is moved rearwardly to the maximum extent, the facets 34 of the wedges 32 are in position to cause the clutch 31 to grip the cup 22. The result of this adjustment is that said cup causes the shaft 11 to be driven as a unit with the motor shaft, the wedges 24 making positive connection between the cup and all of the clutches keyed to the driven shaft. When, however, the collar 25 is moved toward the front, or toward the right in Fig. 1, to the next step, the facets 33 of the wedges 32 and the facets 40 of the wedges 24 will coöperate respectively with the studs 35 and 37$^a$, first releasing the clutch 31 and subsequently setting the clutches 28 and 37′ respectively so as to cause the gear wheels 27 and 37 to become operative. With this arrangement the driven shaft will be operated at an intermediate speed and in the same direction as before, the action being from the motor shaft through the clutch 28, gears 27 and 29, jack shaft 18, pinion 43, gear 37 and clutch 37′. A further movement of the collar 25 in the same direction will bring the facets 41 of the clutch 38′ into operation, the facets 40 passing beyond their studs 37$^a$, but the facets 33 being of considerable length, remain in action. The result of this adjustment will be to cause the shaft 11 to be driven at the slowest speed forwardly, the action being from the motor shaft and jack shaft the same as before described, but thence through the pinion 44, gear 38 and clutch 38′. Movement of the collar to the extreme right in Fig. 1 or toward the front will bring the facets 42 into action, the facets 33 remaining in action as before, and the result will be that the shaft 11 will be driven in a reverse direction from the motor and jack shafts through the pinion 44, idler 45, gear 39 and clutch 39'.

Having thus described my invention, I claim as new and desire to secure by Letters Patent:—

1. In variable speed gearing, the combination of a driving shaft, a driven shaft in alinement with the driving shaft, a sleeve secured to the driving shaft and overlapping the adjacent end of the driven shaft, a cup surrounding said sleeve and adjustable longitudinally thereof, a pair of clutches secured to the sleeve, a gear wheel mounted loosely upon one of said clutches, the other clutch coöperating with said cup, variable speed gears surrounding the driven shaft, means for clutching either of the variable speed gears to the driven shaft, connections between the loosely mounted gear and the variable speed gears, and means movable longitudinally with the cup along the sleeve to cause one of said clutches to operate to drive the driven shaft with the driving shaft or in turn to cause the other clutch through its surrounding gear, said connections, and other clutching means to set in operation the variable speed gears, substantially as set forth.

2. In variable speed mechanism, the combination of a driving shaft, a sleeve secured thereto for rotation therewith, a driven shaft journaled in one end of said sleeve, a collar surrounding the sleeve, a plurality of clutches secured to the sleeve, means connected to said collar to cause either of said clutches to be made operative, a plurality of clutches keyed to the driven shaft, a plurality of gears mounted loosely upon the last mentioned clutches, means to set the last mentioned clutches into operation in succession, means to cause movement of the collar and the last mentioned clutch setting devices, a jack shaft, and gear wheels associated with one of the first mentioned clutches, the jack shaft and the last mentioned plurality of clutches.

3. In variable speed gearing, the combination of driving and driven shafts, a plurality of clutches secured to the driving shaft, a plurality of clutches secured to the driven shaft, a gear wheel surrounding each of the last mentioned clutches, a gear wheel surrounding one of the first mentioned clutches, a jack shaft, a series of gears associated with the jack shaft and adapted to make driving connection between the driving shaft gear and the driven shaft gears at different speeds, direct clutch connections between the driving and driven shafts, and shiftable means serving to cause either the driving and driven shafts to be connected for movement as a unit through said direct clutch connections or any other desired speed to be had through the aforesaid gear members.

4. In variable speed gearing, the combination of a bracket including a cylindrical bearing, a cup journaled and movable longitudinally in said bearing, a sleeve extending through said cup and having a hub constituting a bearing for one end of the cup, a driving shaft connected to the sleeve, a driven shaft having one end journaled in the projecting end of said sleeve, a pair of clutch members secured to the sleeve on opposite sides of said hub, means to slide the cup longitudinally with respect to the bearing and hub, means operated from the cup and movable through said hub serving to make the clutches operative in alternation, one clutch serving to grip the cup to the sleeve, and a train of gears extending from the other clutch through a countershaft to the driven shaft serving to cause the driven shaft to be operated from the driving shaft but in a different manner when the other clutch is made operative.

5. In variable speed gearing, the combination of a bracket including a cylindrical bearing, a cup journaled and slidable in said bearing, a sleeve within the cup, a driving shaft connected to the sleeve, a driven shaft, means to slide the cup along said bearing, a series of independently rotatable gear wheels journaled on the driving and driven shafts, a jack shaft, gears on the jack shaft meshing with the aforesaid gears, and a series of devices associated with said first mentioned gears and cup serving through the slidable movement of the cup to cause either the driving and driven shafts to be operated in unison or the driven shaft to be operated from the driving shaft in a different manner through the jack shaft and its gears.

6. In variable speed gearing, the combination of a fixed bracket including a cylindrical bearing, a cup journaled and slidable in said bearing, said cup being provided on its outer surface with a series of circular teeth, means journaled transversely in said bracket and coöperating with said circular teeth to determine the position longitudinally of said cup, a sleeve and driving shaft secured thereto extending coaxially with said bearing and cup, a driven shaft, a plurality of clutches secured to the sleeve, one clutch coöperating with the cup, a gear wheel mounted upon the other clutch, a plurality of clutches mounted on the driven shaft, a plurality of different sized gear wheels mounted on the last mentioned clutches, means to cause communication between the first mentioned gear wheel and the driven shaft gear wheels, and means operated by virtue of the sliding movement of the cup to cause all of said clutches to become operative in succession and whereby the driving shaft will drive the driven shaft either at the same speed in the same direction or at a speed differing from that of the driving shaft in either direction.

7. In variable speed gearing, the combination of driving and driven shafts, a series of variable speed gear elements arranged between the driving and driven shafts, all of said gear elements being held in definite position and constantly in mesh, and means movable with respect to said shafts and several gear members to cause any desired variable speed for which the gearing is adapted to be made effective or to provide a direct drive between the driving and driven shafts, substantially as set forth.

8. In change speed gearing, the combination of a casing, driving and driven shafts journaled in said casing, a series of gear elements held in fixed planes in the casing between the driving and driven shafts, the directly coöperating gear elements being constantly in mesh, clutch members coöperating with certain of the gear elements and including shiftable wedges serving to cause the gear members of any desired speed to be made effective and means to cause the driven shaft to be connected to the driving shaft for direct operation thereby.

In testimony whereof I have signed my name to this specification in the presence of two subscribing witnesses.

JOSEPH DOVE-SMITH.

Witnesses:
  ALBERT STEWART,
  ALAN V. PARKER.